United States Patent Office 3,033,874
Patented May 8, 1962

3,033,874
17β-PROPENOYL STEROIDS AND PROCESS FOR PREPARING SAME
Ellis R. Pinson, Jr., Waterford, Eugene J. Agnello, Lyme, and Gerald D. Laubach, Niantic, Conn., assignors to Chas. Pfizer & Co., Inc., New York, N.Y., a corporation of Delaware
No Drawing. Filed May 11, 1960, Ser. No. 28,179
2 Claims. (Cl. 260—397.45)

This application is concerned with new and useful steroid compounds. More particularly, it is concerned with certain 17β-propenoyl derivatives of adrenocortically active pregnenes which are useful in the preparation of other therapeutically useful steroids characterized by the presence of a dihydroxylated propanoyl group at the 17β-position. These latter compounds are described and claimed in copending and concurrently filed patent application, Ser. No. 28,180. It is concerned also with a method for the preparation of these valuable compounds.

The compounds of this invention may be represented by the formula:

R—M wherein R is a cyclopentanopolyhydrophenanthrene nucleus characterized by having adrenocortical activity when substituted at the 17β-position with an α-hydroxy acetyl group and M which is located at the 17β-position and replaces the α-hydroxy acetyl group is a propenoyl group.

The compounds of this invention may be further defined as compounds having the formula:

R—C—CH=CH$_2$
‖
O wherein R is an adrenocortically active steroid minus the 17β-(α-hydroxy acetyl) group and the propenoyl moiety is in the 17β-position of the said adrenocortically active steroid.

Adrenocortically active steroids now constitute a well-defined class in the art, and include therapeutically active agents having a wide range of applications in the medical field. Cortisone, hydrocortisone, prednisolone, prednisone, 2-methyl prednisolone, 6-methyl prednisolone, 16-methyl prednisolone, 9α-fluoro hydrocortisone and others have been found to be useful as systemic and topical anti-inflammatory agents. The compounds of this invention are useful in the preparation of compounds of this class.

The preferred compounds within the purview of this invention include those having the formulas:

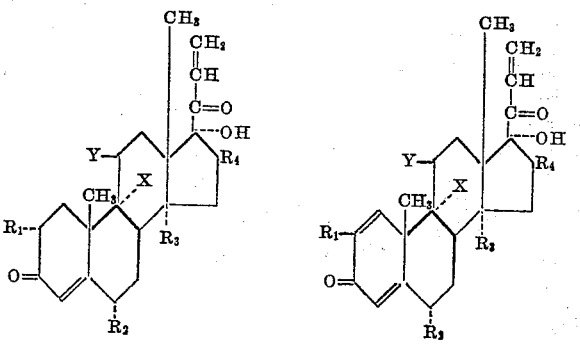
and
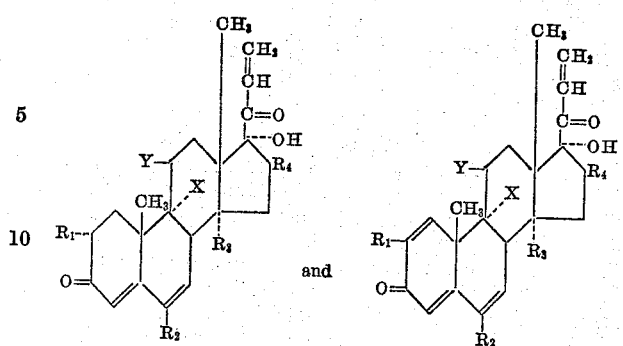

In the above structures, $R_1$ is hydrogen or methyl; $R_2$ is hydrogen, fluorine, chlorine or methyl; $R_3$ is hydrogen or hydroxyl and $R_4$ is

wherein $R_5$ is an acyl group containing only carbon, hydrogen and oxygen, being derived from mono- or dicarboxylic acids containing up to ten carbon atoms; X is hydrogen, halogen, methoxy or ethoxy and Y is keto or β-hydroxyl. In the preferred compounds represented above, the carbon atom at the 16-position is always substituted with at least one hydrogen and at least three of $R_1$, $R_2$, $R_3$ and the second substituent on the number sixteen carbon atom will always be hydrogen.

Starting materials useful for the preparation of the valuable compounds of this invention include those quaternary alkyl ammonium halide salts having the formula:

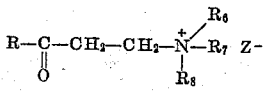

wherein R has the same meaning as above and the β-(trialkyl ammonium halide)-propanoyl group is located at the 17β-position and replaces the 17β-(α-hydroxy acetyl) group. In the above formula, $R_6$, $R_7$ and $R_8$ which may be the same or different in a specific compound are selected from the group consisting of alkyl containing up to four carbon atoms and Z is a halogen atom. For the preparation of the preferred compounds, R will have the structure illustrated above.

Starting materials are prepared in accordance with the procedure described and claimed in copending and concurrently filed patent application, Serial No. 28,178. This application describes their preparation from the corresponding 21-desoxy compounds by treatment with a mixture of formaldehyde and lower alkyl amines followed by conversion of the resulting 21-dialkylaminomethyl compounds to quaternary lower alkyl ammonium halide compounds by reaction with a lower alkyl halide.

These latter compounds are converted to the valuable compound of this invention by reaction with water or aqueous alkali for from about one to about six hours at a temperature of from about 20° C. to about 30° C. Temperatures below and above this preferred range can be used although less satisfactorily. Thus, if a temperature considerably below 20° C. is used, the reaction is too slow to be practical and if a temperature considerably above 30° C. is used, there may be some decomposition of the desired product.

It should be mentioned that with certain less water soluble quaternary compounds, it may be necessary to add a small amount, say from about 1% to about 20% of a solvent such as tert-butanol to solubilize the starting compound.

Although the desired products form by simple reaction with water, they form more readily and often in higher yield if the reaction is carried out at an alkaline pH of from 7.5 to about 12. The desired alkalinity may be effected by adding a small amount of aqueous alkaline reagent. Illustrative alkaline reagents include, for example, aqueous solutions containing from about 2% to about 10% by weight of an alkali or alkaline earth metal hydroxide, oxide, carbonate, bicarbonate or alkali metal acetates, tartrates or citrates. Approximately three to five percent by weight of aqueous sodium bicarbonate solution has been found to afford excellent yields, and this is the preferred reagent.

In summary, the desired products are formed by mixing the quaternary lower alkyl ammonium halides illustrated above in an aqueous solution at a pH of from about 7 to about 12 at a temperature of from about 20° C. to about 30° C. for a period of from about one to about six hours. The aqueous solution may contain a small amount of a tertiary alcohol.

Usually the desired product will precipitate from the reaction mixture as it forms and reaction is complete when no more precipitate forms. Occasionally, however, the desired product will not precipitate. In these cases, the product may be isolated by extraction with a water immiscible hydrocarbon or halogenated hydrocarbon solvent including, for example, ethylene dichloride, chloroform, carbon tetrachloride, chlorobenzene, benzene and pentane. It is, of course, possible to use an extraction procedure whether or not the product precipitates and this may often result in better overall yields. If an extraction step is used, it may be desirable to add a small amount of acid to the aqueous mixture to insure that all of the amine by-product of the main reaction is converted to an acid salt which is insoluble in the organic solvent.

Occasionally, when a quaternary iodide is used, the iodide salt which forms is insoluble in water. Obviously, this could lead to contamination of the final product particularly if it is insoluble in water and co-precipitates with the iodide salt. In these instances and in any other instances where there is co-precipitation of the main product and by-product, it is always preferred to use an extraction step.

The propenoyl compounds are isolated from the organic solvent by removal of the solvent in vacuo preferably after drying the solvent using an anhydrous drying agent such as sodium or magnesium sulfate. The product may be further purified by recrystallization from a suitable solvent such as methyl alcohol.

The synthesis set forth below is illustrative of the preparation of the compounds of this invention from the 21-desoxy compounds as described and claimed in copending and concurrently filed patent application Serial No. 28,178. It shows the preparation of 9α-fluoro-21-methylene-Δ⁴-pregnene-11β,17α-diol-3,20-dione. It also illustrates the use of these compounds in the preparation of the valuable therapeutic agents as described and claimed in copending and concurrently filed patent application, Serial No. 28,180. These latter therapeutic agents are useful for the same purposes as hydrocortisone and prednisolone. As will be noted, they are prepared by treatment of the corresponding propenoyl compound with osmium tetroxide. The reaction is carried out by contacting the propenoyl compound with osmium tetroxide in a lower ether solvent containing up to eight carbon atoms such as dioxane at a temperature of from about 20° C. to about 30° C. for from about 16 to about 72 hours. The resulting product is an osmate ester which may be decomposed with hydrogen sulfide to precipitate osmium sulfide. The desired product is then recovered from the filtrate, for example, by evaporation.

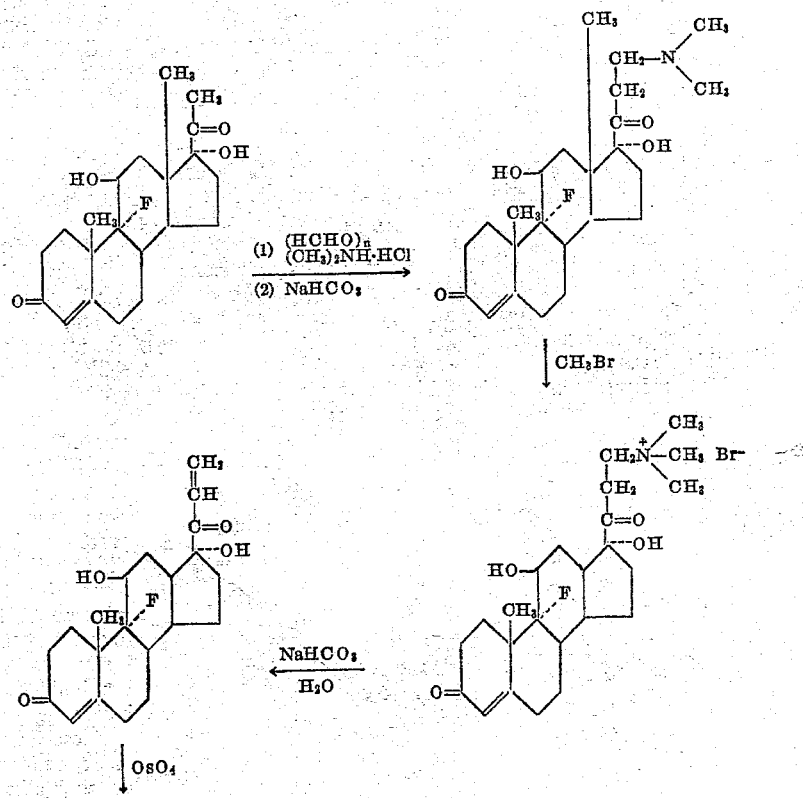

The following examples are given solely for the purpose of illustration and are not to be construed as limitations of this invention, many variations of which are possible without departing from the spirit or scope thereof.

EXAMPLE I

21-Methylene-$\Delta^{1,4}$-Pregnadiene-11$\beta$,17$\alpha$-Diol-3,20-Dione

A solution of 200 mg. of 21-dimethylaminomethyl-$\Delta^{1,4}$-pregnadiene-11$\beta$,17$\alpha$-diol-3,20-dione methyl bromide (prepared as described in copending and concurrently filed patent application Serial No. 28,178) in 10 ml. of water was prepared and clarified by filtration. To the solution there was added 68 mg. of sodium bicarbonate in 2 ml. of water at 25° C. A white precipitate separates immediately. The suspension is stirred for 1 hour, filtered, washed with water, and dried in vacuo. The precipitate is recrystallized from methanol to yield the desired product melting at 217–218° C.

$\lambda_{max}$=230 mu. $\epsilon$=17,600.

Analysis.—Calcd. for $C_{22}H_{28}O_4$.—C=73.92; H=8.18. Found: C=73.77; H=8.13.

EXAMPLE II

21-Methylene-$\Delta^4$-Pregnene-11$\beta$,17$\alpha$-Diol-3,20-Dione

A solution containing 200 mg. of 21-dimethylaminomethyl-$\Delta^4$-pregnene-11$\beta$,17$\alpha$-diol-3,20-dione butyl chloride was dissolved in 10 ml. of water and stirred at 20° C. for 6 hours. The desired product separates and is recovered by filtration.

EXAMPLE III

2$\alpha$-Methyl-21-Methylene-$\Delta^4$-Pregnene-11$\beta$,17$\alpha$-Diol-3,20-Dione A solution containing 200 mg. of 21-dimethylaminomethyl-2$\alpha$-methyl-$\Delta^4$-pregnene-11$\beta$,17$\alpha$-diol-3,20-dione methyl bromide is dissolved in 15 ml. of water and clarified by filtration. The solution is adjusted to pH 12 by the cautious addition of 2% aqueous sodium hydroxide at 30° C. A white precipitate separates immediately. The suspension is stirred for 4 hours and the desired product recovered by filtration.

EXAMPLE IV

9$\alpha$-Fluoro-21-Methylene-$\Delta^{1,4,6}$-Pregnatriene-11$\beta$,17$\alpha$-Diol-3,20-Dione A solution containing 400 mg. of 21-diethylaminomethyl-9$\alpha$-fluoro-$\Delta^{1,4,6}$-pregnatriene-11$\beta$,17$\alpha$-diol-3,20-dione ethylchloride is dissolved in 15 ml. of water and the solution clarified by filtration. A 2% aqueous solution of sodium citrate in 2 ml. of water is added. The resulting mixture is stirred for 4 hours during which time the desired product separates and is recovered by filtration.

EXAMPLE V

21-Methylene-$\Delta^4$-Pregnene-11$\beta$,16$\alpha$,17$\alpha$-Triol-3,20-Dione A solution containing 200 mg. of 21-diethylaminomethyl-$\Delta^4$-pregnene-11$\beta$,16$\alpha$,17$\alpha$-diol-3,20-dione 21-acetate methyl bromide was dissolved in 15 ml. of water and stirred at 25° C. for 4 hours. The desired product separates and is recovered by filtration.

EXAMPLE VI

6$\alpha$-Methyl-21-Methylene-$\Delta^{1,4}$-Pregnadiene-17$\alpha$-ol-3,11,20-Trione A solution containing 300 mg. of 21-methyl-ethylaminomethyl-6$\alpha$-methyl-$\Delta^{1,4}$-pregnadiene-17$\alpha$-ol-3,11,20-trione butyl chloride was dissolved in 20 ml. of water adjusted to pH 9.5 with aqueous sodium carbonate and stirred at 30° C. for six hours. The desired product separates and is recovered by filtration.

EXAMPLE VII

6$\alpha$-Chloro-21-Methylene-$\Delta^4$-Pregnene-11$\beta$,17$\alpha$-Diol-3,20-Dione A solution containing 150 mg. of 21-diethylaminomethyl-6$\alpha$-chloro-$\Delta^4$-pregnene-11$\beta$,17$\alpha$-diol-3,20-dione methyl iodide is dissolved in 15 ml. of water and stirred at 25° C. for 4 hours. The resulting reaction mixture is extracted with chloroform, filtered and the desired product recovered by evaporation of the filtrate.

EXAMPLE VIII

16$\alpha$-Fluoro-21-Methylene-$\Delta^{1,4}$-Pregnadiene-11$\beta$,17$\alpha$-Diol-3,20-Dione A solution containing 300 mg. of 21-dipropylaminomethyl-16$\alpha$-fluoro-$\Delta^{1,4}$-pregnadiene-11$\beta$,17$\alpha$-diol-3,20-dione-butyl fluoride was stirred in 20 ml. of 5% aqueous sodium bicarbonate solution. The resulting mixture is made slightly acid with 2% aqueous hydrochloric acid and extracted with ethylene dichloride. The organic solvent is separated, dried over anhydrous sodium sulfate, filtered and the desired product isolated by evaporation of the solvent.

The following products are prepared using the procedures of the foregoing examples. The list is illustrative of the compounds within the purview of this invention and is given to avoid unnecessary repetition of experimental details.

21-methylene-$\Delta^{1,4}$-pregnadiene-11$\beta$,14$\alpha$,17$\alpha$-triol-3,20-dione
6-fluoro-21-methylene-$\Delta^4$-pregnene-11$\beta$,17$\alpha$-diol-3,20-dione
6$\alpha$-fluoro-21-methylene-$\Delta^4$-pregnene-17$\alpha$-ol-3,11,20-trione
6$\alpha$-fluoro-9$\alpha$-bromo-21-methylene-$\Delta^4$-pregnene-11$\beta$,17$\alpha$-diol-3,20-dione
6$\alpha$,9$\alpha$-difluoro-21-methylene-$\Delta^4$-pregnene-11$\beta$,17$\alpha$-diol-3,20-dione
6$\alpha$-fluoro-21-methylene-$\Delta^{1,4}$-pregnadiene-11$\beta$,17$\alpha$-diol-3,20-dione
6$\alpha$-fluoro-9$\alpha$-bromo-21-methylene-$\Delta^{1,4}$-pregnadiene-11$\beta$,14$\alpha$,17$\alpha$-triol-3,20-dione 6α,9α-difluoro-21-methylene-Δ$^{1,4}$-pregnadiene-11β,17α-diol-3,20-dione
6α,9α-difluoro-21-methylene-Δ$^{1,4}$-pregnadiene-17α-ol-3,11,20-trione
6α,9α-difluoro-21-methylene-Δ$^4$-pregnene-17α-ol-3,11,20-trione
6α-fluoro-9α-chloro-21-methylene-Δ$^4$-pregnene-11β,17α-3,20-dione
6α-fluoro-9α-chloro-21-methylene-Δ$^4$-pregnene-17α-ol-3,11,20-trione
6α-fluoro-9α-bromo-21-methylene-Δ$^4$-pregnene-17α-ol-3,11,20-trione
6α-fluoro-9α-chloro-21-methylene-Δ$^{1,4}$-pregnadiene-17α-ol-3,11,20-trione
6α-fluoro-9α-bromo-21-methylene-Δ$^{1,4}$-pregnadiene-17α-ol-3,11,20-trione
6α-fluoro-21-methylene-Δ$^4$-pregnene-17α-ol-3,11,20-trione
6α-fluoro-21-methylene-Δ$^{1,4}$-pregnadiene-17α-ol-3,11,20-trione
6α-fluoro-21-methylene-Δ$^4$-pregnene-11β,16α-diol-3,20-dione
6α-fluoro-21-methylene-Δ$^4$-pregnene-11β,16α,17α-triol-3,20-dione
6α-fluoro-21-methylene-Δ$^4$-pregnene-16α,17α-diol-3,11,20-trione
6α-fluoro-21-methylene-Δ$^{1,4}$-pregnadiene-11β,16α,17α-triol-3,20-dione
6α-fluoro-21-methylene-Δ$^{1,4}$-pregnadiene-16α,17α-diol-3,11,20-trione
16α-methyl-21-methylene-Δ$^4$-pregnene-11β,17α-diol-3,20-dione
16β-methyl-21-methylene-Δ$^4$-pregnene-11β,17α-diol-3,20-dione
9α-bromo-16β-methyl-21-methylene-Δ$^4$-pregnene-11β,17α-diol-3,20-dione
9α-fluoro-16α-methyl-21-methylene-Δ$^4$-pregnene-11β,17α-diol-3,20-dione
9α-fluoro-16β-methyl-21-methylene-Δ$^4$-pregnene-11β,17α-diol-3,20-dione
9α-fluoro-16α-methyl-21-methylene-Δ$^{1,4}$-pregnadiene-11β,17α-diol-3,20-dione
9α-fluoro-16β-methyl-21-methylene-Δ$^{1,4}$-pregnadiene-11β,17α-diol-3,20-dione
6α-methyl-21-methylene-Δ$^{1,4}$-pregnadiene-11β,17α-diol-3,20-dione
6α-methyl-21-methylene-Δ$^4$-pregnene-17α-ol-3,11,20-trione
6α-methyl-21-methylene-Δ$^{1,4}$-pregnadiene-17α-ol-3,11,20-trione
9α-fluoro-21-methylene-Δ$^{4,6}$-pregnadiene-11β,17α-diol-3,20-dione
9α-fluoro-21-methylene-Δ$^4$-pregnene-11β,17α-diol-3,20-dione
9α-chloro-21-methylene-Δ$^4$-pregnene-11β,17α-diol-3,20-dione
9α-bromo-21-methylene-Δ$^4$-pregnene-11β,17α-diol-3,20-dione
9α-iodo-21-methylene-Δ$^4$-pregnene-11β,17α-diol-3,20-dione
9α-methoxy-21-methylene-Δ$^4$-pregnene-11β,17α-diol-3,20-dione
9α-ethoxy-21-methylene-Δ$^4$-pregnene-11β,17α-diol-3,20-dione
9α-fluoro-21-methylene-Δ$^4$-pregnene-17α-ol-3,11,20-trione
9α-chloro-21-methylene-Δ$^4$-pregnene-17α-ol-3,11,20-trione
9α-bromo-21-methylene-Δ$^4$-pregnene-17α-ol-3,11,20-trione
9α-iodo-21-methylene-Δ$^4$-pregnene-17α-ol-3,11,20-trione
9α-methoxy-21-methylene-Δ$^4$-pregnene-17α-ol-3,11,20-trione
9α-ethoxy-21-methylene-Δ$^4$-pregnene-17α-ol-3,11,20-trione
9α-fluoro-21-methylene-Δ$^{1,4}$-pregnadiene-11β,17α-diol-3,20-dione
9α-fluoro-6α-methyl-21-methylene-Δ$^{1,4}$-pregnadiene-11β,17α-diol-3,20-dione
9α-bromo-6α-methyl-21-methylene-Δ$^{1,4}$-pregnadiene-11β,17α-diol-3,20-dione
9α-fluoro-6α-methyl-21-methylene-Δ$^4$-pregnene-11β,17α-diol-3,20-dione
9α-bromo-6α-methyl-21-methylene-Δ$^4$-pregnene-11β,17α-diol-3,20-dione
2α-methyl-21-methylene-Δ$^4$-pregnene-17α-ol-3,11,20-trione
9α-bromo-2α-methyl-21-methylene-Δ$^4$-pregnene-11β,17α-diol-3,20-dione
9α-fluoro-2α-methyl-21-methylene-Δ$^4$-pregnene-11β,17α-diol-3,20-dione
9α-fluoro-2α-methyl-21-methylene-Δ$^4$-pregnene-17α-ol-3,11,20-trione
21-methylene-Δ$^{1,4,6}$-pregnatriene-11β,17α-diol-3,20-dione
21-methylene-Δ$^{4,6}$-pregnadiene-11β,14α,17α-triol-3,20-dione
21-methylene-Δ$^{4,6}$-pregnadiene-14α,17α-diol-3,11,20-trione
21-methylene-Δ$^{4,6}$-pregnadiene-11β,17α-diol-3,20-dione
21-methylene-Δ$^{1,4,6}$-pregnatriene-11β,14α-diol-3,20-dione
16α-methyl-21-methylene-Δ$^{4,6}$-pregnadiene-11β,17α-diol-3,20-dione
16β-methyl-21-methylene-Δ$^{4,6}$-pregnadiene-11β,17α-diol-3,20-dione
9α-bromo-16α-methyl-21-methylene-Δ$^{4,6}$-pregnadiene-11β,17α-diol-3,20-dione
9α-bromo-16β-methyl-21-methylene-Δ$^{4,6}$-pregnadiene-11β,17α-diol-3,20-dione
9α-fluoro-16α-methyl-21-methylene-Δ$^{4,6}$-pregnadiene-11β,17α-diol-3,20-dione
9α-fluoro-16β-methyl-21-methylene-Δ$^{4,6}$-pregnadiene-11β,17α-diol-3,20-dione
9α-fluoro-16α-methyl-21-methylene-Δ$^{1,4,6}$-pregnatriene-11β,17α-diol-3,20-dione
6-methyl-21-methylene-Δ$^{4,6}$-pregnadiene-11β,17α-diol-3,20-dione
6-methyl-21-methylene-Δ$^{1,4,6}$-pregnatriene-11β,17α-diol-3,20-dione
6-methyl-21-methylene-Δ$^{4,6}$-pregnadiene-17α-ol-3,11,20-trione
6-methyl-21-methylene-Δ$^{1,4,6}$-pregnatriene-17α-ol-3,11,20-trione
9α-fluoro-21-methylene-Δ$^{4,6}$-pregnadiene-11β,17α-diol-3,20-dione
9α-chloro-21-methylene-Δ$^{4,6}$-pregnadiene-11β,17α-diol-3,20-dione
9α-bromo-21-methylene-Δ$^{4,6}$-pregnadiene-11β,17α-diol-3,20-dione
9α-iodo-21-methylene-Δ$^{4,6}$-pregnadiene-11β,17α-diol-3,20-dione
9α-methoxy-21-methylene-Δ$^{4,6}$-pregnadiene-11β,17α-diol-3,20-dione
9α-ethoxy-21-methylene-Δ$^{4,6}$-pregnadiene-11β,17α-diol-3,20-dione
9α-fluoro-21-methylene-Δ$^{4,6}$-pregnadiene-17α-ol-3,11,20-trione
9α-chloro-21-methylene-Δ$^{4,6}$-pregnadiene-17α-ol-3,11,20-trione
9α-bromo-21-methylene-Δ$^{4,6}$-pregnadiene-17α-ol-3,11,20-trione
9α-iodo-21-methylene-Δ$^{4,6}$-pregnadiene-17α-ol-3,11,20-trione
9α-methoxy-21-methylene-Δ$^{4,6}$-pregnadiene-17α-ol-3,11,20-trione
9α-ethoxy-21-methylene-Δ$^{4,6}$-pregnadiene-17α-ol-3,11,20-trione
9α-fluoro-21-methylene-Δ$^{1,4,6}$-pregnatriene-11β,17α-diol-3,20-dione 9α-fluoro-6-methyl-21-methylene-$\Delta^{1,4,6}$-pregnatriene-11β,17α-diol-3,20-dione
9α-bromo-6-methyl-21-methylene-$\Delta^{1,4,6}$-pregnatriene-11β,17α-diol-3,20-dione
9α-fluoro-6-methyl-21-methylene-$\Delta^{4,6}$-pregnadiene-11β,17α-diol-3,20-dione
9α-bromo-6-methyl-21-methylene-$\Delta^{4,6}$-pregnadiene-11β,17α-diol-3,20-dione
2α-methyl-21-methylene-$\Delta^{4,6}$-pregnadiene-11β,17α-diol-3,20-dione
2α-methyl-21-methylene-$\Delta^{4,6}$-pregnadiene-17α-ol-3,11,20-trione
9α-bromo-2α-methyl-21-methylene-$\Delta^{4,6}$-pregnadiene-11β,17α-diol-3,20-dione
9α-fluoro-2α-methyl-21-methylene-$\Delta^{4,6}$-pregnadiene-11β,17α-diol-3,20-dione
9α-fluoro-2α-methyl-21-methylene-$\Delta^{4,6}$-pregnadiene-17α-ol-3,11,20-trione
16α-fluoro-21-methylene-$\Delta^{4}$-pregnene-11β,17α-diol-3,20-dione
6α-chloro-9α-fluoro-21-methylene-$\Delta^{1,4}$-pregnadiene-17α-ol-3,11,20-trione
16β-fluoro-21-methylene-$\Delta^{4}$-pregnene-17α-ol-3,11,20-trione
9α,16β-difluoro-21-methylene-$\Delta^{1,4}$-pregnadiene-11β,17α-diol-3,20-dione The 16α-hydroxyl compounds from the foregoing examples are converted into esters in accordance with standard procedures. The esters prepared included the propionates, butyrates, propenoates, decanoates, hemiglutarates, hemisuccinates, benzoates and cyclohexanoates.

Compounds within the purview of this invention with an 11-keto function are prepared either from starting materials having this substituent or by oxidation of the final product with chromium trioxide or the chromic acid-pyridine complex. With 16-hydroxylated compounds, the hydroxyl group should be protected by esterification prior to oxidation.

What is claimed is:
1. A compound selected from the group consisting of those having the formulae:

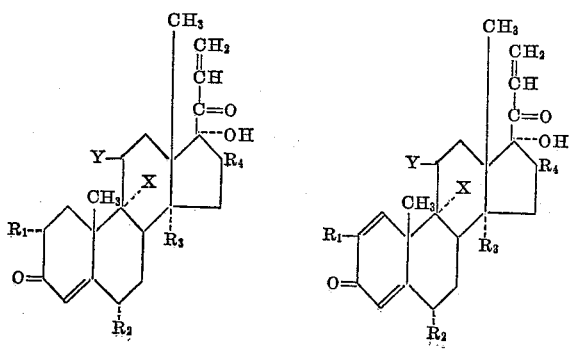

and

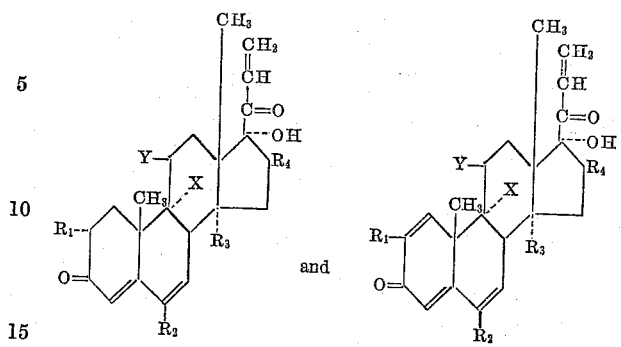

and wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; and $R_4$ is selected from the group consisting of

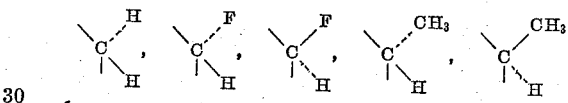

and

wherein $R_5$ is selected from the group consisting of hydrogen and acyl groups containing only carbon, hydrogen and oxygen and derived from mono- and dicarboxylic acids containing up to ten carbon atoms; X is selected from the group consisting of hydrogen, halogen, methoxy and ethoxy and Y is selected from the group consisting of keto and β-hydroxyl.

2. A process for the preparation of a compound as claimed in claim 1 which comprises maintaining the corresponding 17β-(tri-alkyl ammonium halide)-propanoyl compound, wherein the alkyl groups contain up to four carbon atoms, in aqueous solution at a pH of from about 7 to about 12 at a temperature of from about 20° C. to about 30° C. for a period of from about 1 to about 6 hours.

No references cited.